United States Patent

Maestrelli

[11] 4,365,489
[45] Dec. 28, 1982

[54] CLEANING LIQUID LEVEL REGULATOR FOR DRY CLEANING MACHINES

[75] Inventor: Gino Maestrelli, Milan, Italy

[73] Assignee: Maestrelli S.p.A., Milan, Italy

[21] Appl. No.: 229,675

[22] Filed: Jan. 29, 1981

[30] Foreign Application Priority Data

Feb. 18, 1980 [IT] Italy ............................ 20816/80[U]

[51] Int. Cl.³ .............................................. D06F 43/02
[52] U.S. Cl. .................................... 68/212; 137/398; 137/412
[58] Field of Search ............. 68/207, 208, 212, 235 R; 137/398, 412, 428

[56] References Cited

U.S. PATENT DOCUMENTS 2,203,766  6/1940  Baer et al. ...................... 137/412 X

FOREIGN PATENT DOCUMENTS

| 808116 | 7/1951 | Fed. Rep. of Germany | 137/412 |
| 1094695 | 12/1960 | Fed. Rep. of Germany | 68/207 |
| 2261604 | 4/1974 | Fed. Rep. of Germany | 68/207 |
| 133404 | 10/1951 | Sweden | 68/207 |
| 1227351 | 4/1971 | United Kingdom | 137/412 |

Primary Examiner—Philip R. Coe
Attorney, Agent, or Firm—Wenderoth, Lind & Ponack

[57] ABSTRACT

A liquid level regulator for the solvent of a dry cleaning machine comprises a box-like body mounted within a cleaning chamber of the machine and having holes to allow the solvent to penetrate thereinto, wherein the liquid is calmed and forms a substantially even level. This level is detected in order to control the same both within the machine chamber and within the box-like body.

8 Claims, 3 Drawing Figures

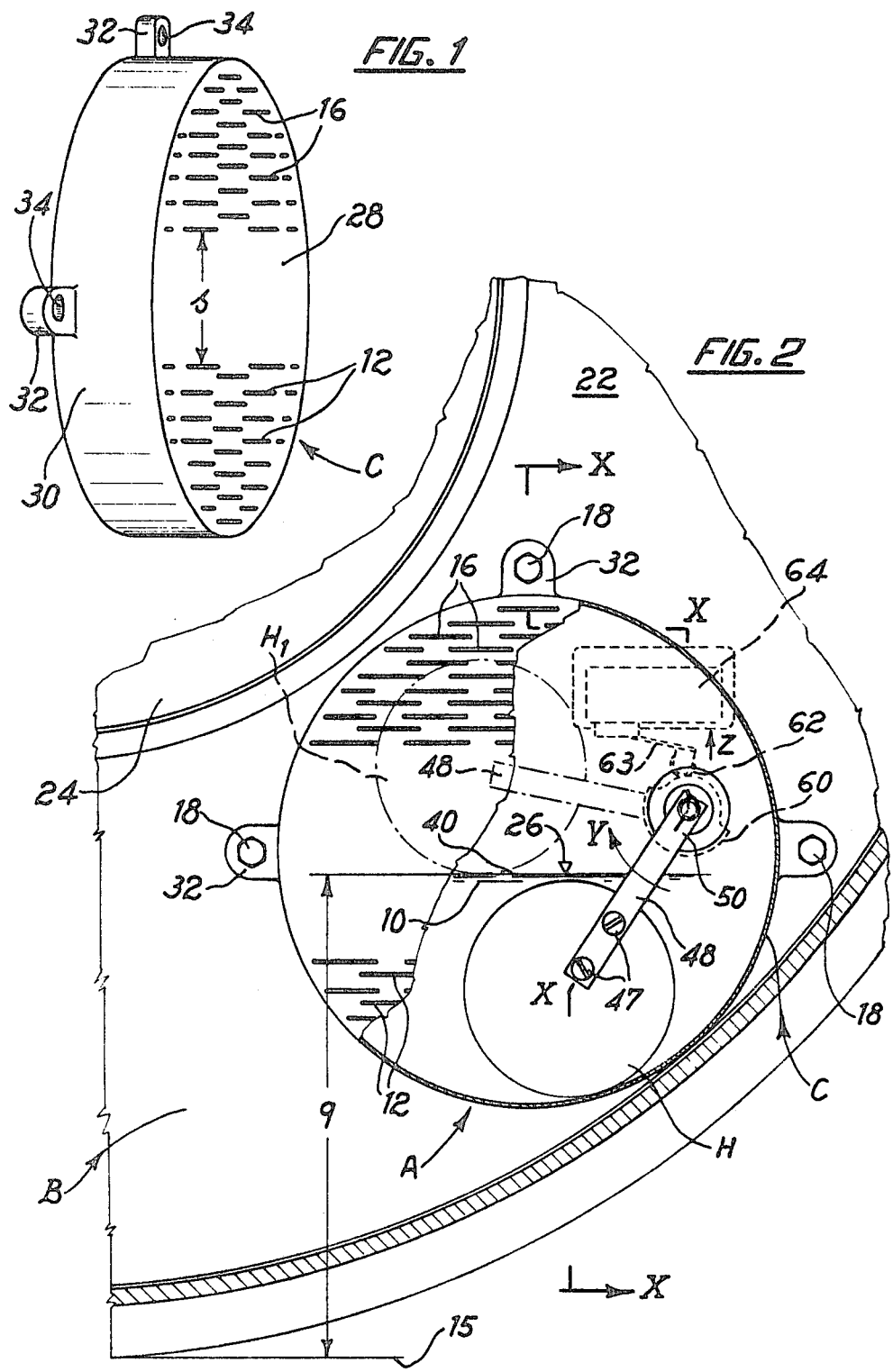

CLEANING LIQUID LEVEL REGULATOR FOR DRY CLEANING MACHINES

BACKGROUND OF THE INVENTION

This invention relates to a cleaning liquid level regulator, for dry cleaning machines.

DESCRIPTION OF THE PRIOR ART

It is known to obtan regulation of the cleaning liquid level in a dry cleaning machine by regulating device which are mounted outside the machine cleaning drum and chamber, such devices having a comparatively complicated structure and making use of complex hydraulic connections. Further, this known device has another drawback in that it does not have sufficiently good properties with regard to prompt response and accuracy. All attempts for avoiding the above drawbacks have not been successful up to now.

SUMMARY OF THE INVENTION

Accordingly, an object of this invention is to avoid these and other drawbacks.

The invention includes a level regulator for controlling the level of the liquid solvent in dry a cleaning machine, the regulator comprising at least a box-shaped body which is able to allow passage of both the liquid solvent and air therethrough and which can be fitted inside the rotary drum housing chamber of a dry cleaning machine. The box shaped body is provided with means responsive to the liquid level therein, which level substantially corresponds to that of the liquid contained in the cleaning chamber. The liquid is able to enter the box-shaped body and to be brought therein in a rest condition protected from turbulence and agitation in the liquid due to movement of drum, in such a manner that the free surface of the liquid contained in the box-shaped body can be regarded as being a substantially horizontal surface. This enables the level of such surface to be accurately detected and controlled by regulating means, which ensure that the liquid level in the box-shaped body and therefore in the cleaning chamber is maintained at a suitable and preferably constant value during the entire cleaning operation.

According to an advantageous embodiment of the invention, the box-shaped body is formed with a lower range of small openings for passage of liquid solvent into the same and with an upper range of small openings, spaced apart with respect to the lower openings, for passage therethrough of the air existing above the liquid. The means responsive to the liquid level in the box-shaped body includes a float member which is able to follow variations in the level and cooperates with an adjustable electromechanical transmission, whose output is applied to the liquid solvent discharge tap, for remote control of the same in order to maintain at the desired value the liquid level inside the box-shaped body and therefore the cleaning chamber.

BRIEF DESCRIPTION OF THE DRAWINGS

FIG. 1 is a perspective view of a box-shaped body appertaining to a level regulator according to this invention, the body having the shape of a hollow cylindrical box that is devoid of a circular wall opposite to that provided with openings for passage of liquid and air.

FIG. 2 is a partial front view of a level regulator when fitted inside the working chamber of a dry cleaning machine.

DESCRIPTION OF THE PREFERRED EMBODIMENT

Figure 3:
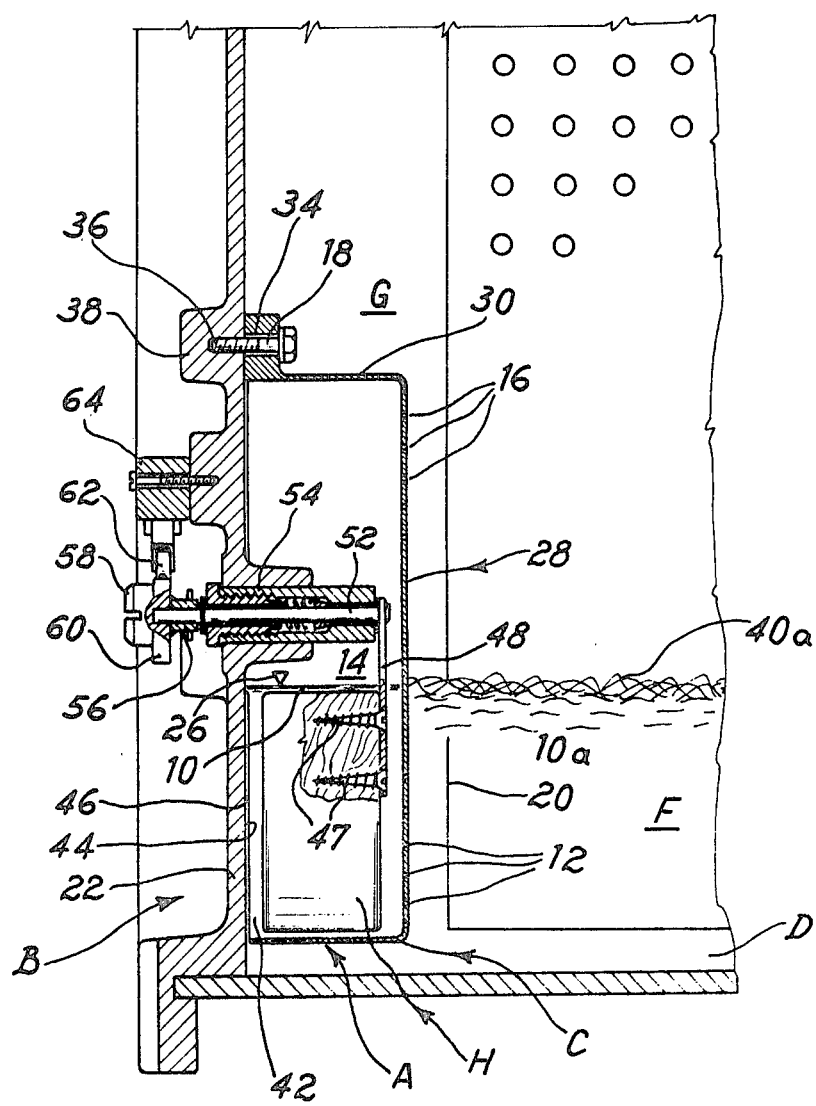
FIG. 3 is a cross-sectional view taken along the broken line X—X of FIG. 2.

Referring now to the drawings, a level regulator A controls the level of a liquid 10 that is the solvent used in a dry cleaning machine B, only the parts thereof which embody the invention being shown. The level regulator comprises a box-shaped body C which is formed with lower small openings 12 for the passage of liquid solvent 10 into the interior 14 of the body, and upper small openings 16 for passage therethrough of air existing above the cleaning liquid 10. Box-shaped body C is fitted by any suitable means, for example bolts 18, to the inside of a cleaning chamber D of a machine B, chamber D housing a rotating drum F. The body C is positioned in a space G which is defined between a front side 20 of drum F and a machine fixed outer wall 22 that is provided with a door 24 through which the clothes or the like to be cleaned are introduced. The cavity 14, which is formed when box-shaped body C is fastened to the machine wall 22, has mounted therein means H which are responsive to the level 26 of liquid 10 within cavity 14.

According to the illustrated embodiment, body C consists of a hollow cylindrical box having a front circular wall 28 and a cylindrical side wall 30, the rear circular wall of the box, opposite to wall 28, being absent. The box C thus possesses a cup-shaped structure. The cylindrical wall 30 has three radially projecting parts or tabs 32 each of which is formed with a hole 34 for fitting a bolt 18 therein. The threaded shanks 36 of bolts 18 are received in corresponding threaded holes formed in the wall 22 or, as in the illustrated example, in bosses 38 extending from wall 22.

Small openings 12 are formed in the circular wall 28 of box C and belong to a lower range of openings that are designed for allowing liquid solvent 10 from chamber D to pass into cavity 14, while small openings 16 are likewise formed in wall 28 and belong to an upper range of openings forming passageways for the air existing above the liquid surface 40, the two opening ranges 12-16 being spaced apart by distance s.

Once box C is fastened in the above described manner on wall 22, a cavity 14 is formed which is separated from both the outer environment and chamber D, as the box opening 42 (in lieu of the box rear circular wall) is now closed by a surface 44 of wall 22. However an intervening space 46 is left between the walls 30 and 22 to allow for the liquid 10 and air to pass therebetween into the lower and the upper parts of cavity 14.

The means H, which are responsive to the level 26 of liquid 10 in a still condition inside the box C, comprise a cylindrical float-member with suitable diameter and thickness, preferably made of wood, which is fastened by means of screws 47 to an arm 48 having an end 50 which is keyed to a horizontal shaft or spindle 52. Shaft 52 sealingly projects through a hole 54 in the wall 22, outwardly of the machine B, and cooperates with a clutch means 56 ending in a head 58 provided with an angularly cam 60, Cam 60 is tightly applied to the surface of a contact roller 62 of a micro-switch 64 appertaining to a known electro-mechanical transmission, the output of which is applied to a discarge tap or cock (not shown) for solvent 10, the arrangement allowing such discharge tap to be remote-controlled in order to maintain the liquid level in the box C and, therefore, in the cleaning chamber D, at a desired value.

The operation and advantages of the illustrated level regulator can be ready appreciated and summarized as follows.

Once the box C is fitted to the wall 22 and the angular position of cam 60 is adjusted with reference to contact roller 62 of microswitch 64, it will be possible always to maintain the liquid level in the dry cleaning machine B. at a constant value druring the dry cleaning operation. Alternatively, the value of the level may be varied as a function of the amount of liquid solvent that is required to be used for particular dry cleaning operations.

Assuming that the level of dry cleaning liquid is that shown in FIGS. 2 and 3, it should be noted that , due to the agitation and whirling motion imparted to liquid 10a within the dry cleaning chamber D as a result of the rotation of drum F, liquid 10a is in a state of turbulence and, in fact, its level cannot be clearly defined, as the liquid turbulence and movement create a free surface 40a which throughout is irregular and wavy in character. However, the cleaning liquid enters, through the lower holes 12, the chamber 14 where the liquid is brought to a rest or nonturbulent condition, so that inside the box C can be obtained a small, substantially at-rest volume of liquid having throughout an even, flat and substantially horizontal surface 40. Accordingly, surface 40 forms a level 26 which is able to be accurately detected and controlled by means H, which means ensure that the level in chamber 14 and, therefore, in chamber D, is maintained at the most suitable and preferably constant value during all dry cleaning steps.

When the float-member H is in its lower, rest position (indicated in solid lines), no liquid exists in chamber 14, as the dry cleaning stage has not yet started.

The head 58 and thus the cam 60 can be registered to obtain a desired angular position of the cam via clutch means 56 which maintains a torsional connection between the head 58 and shaft 52. Once the head is angularly adjusted, the solvent is admitted into the cleaning chamber D, and accordingly into the box C through holes 12. This causes a level 26 to be established in chamber 14, which level is equal to that existing in chamber D. As this level become higher, the air existing above the surface 26 is discharged through holes 16. As previously stated, the solvent can enter the chamber 14 also through the intervening space 46. Obviously, as level 26 increases, the float member H moves up by rotating in the direction of arrow Y together with the shaft 52 and cam 60, whose working face thus slides on the contact roller 62 of micro-switch 64. At the same time, as the level 26 is formed in the box C, a corresponding turbulent and wavying level is simultaneously formed by the liquid 10a in chamber D, this liquid being subjected to a turbulent motion by the rotating drum F, in such a manner that the free surface 40a of such liquid is agitated and uneven. On the contrary, the corresponding surface 40 is brought to a calmed down, still and horizontal condition. According to the main feature of the invention, level regulator A constantly maintains hydraulic communication with the dry cleaning chamber D to ensure formation of liquid level 26 having a free horizontal surface 40, corresponding to turbulent surface 40a, which level allows for accurate detection thereof being carried out by means H. Such level can be then maintained at a constant value, or may be adjusted as a function of the angular position imparted to cam 60.

In the illustrated example, when the level 26 attains a position whereat the free surface 40 generates a pre-set head to be maintained at a constant value, the float member occupies a position $H_1$ as shown in dash and dotted lines. During the rotation of cam 60, corresponding to angular displacement of the float member from the lower, at-rest position H to position H1, contract roller 62 and thus switch 64 and the associated electro-mechanical transmission which acts on the solvent discharge tap, are in conditions of discharge tap closure in order to create the required liquid head and, threfore, the level 26. If this level tends to increase, together with the solvent level inside the chamber D, a further rotation of float-member in the direction of arrow Y will cause contact rolller 62 to be lifted in the direction of arrow Z and, therefore, switch 64 and electro-mechanical transmission to be so actuated as to cause the discharge tap to open for discharging a given amount of liquid solvent, until reinstating the required level in the dry cleaning chamber. As already stated, in the illustrated example the level is supposed to remain at a height q with respect to a reference plane 15, because adjustment of the head 58 was made as a function of such a height. However, such height may be brought to lower or higher values by correspondingly adjusting the angular position of head 58 and thus of cam 60, so that the roller 62 and associated contact blade 63 of switch 64, under the control of the angularly adjusted cam 6O, will move either in the direction of the arrow Z or in the opposite direction, in order to cause the discharge tap to respectively open or close.

The fact that box C has been fitted inside the dry cleaning chamber D makes it possible to obtain successful detection, adjustment and maintenance of the liquid solvent level 26, clearly leading to great advantages with regard to maximum ease of the regulator application and operation.

It is to be understood that many modifications may be made to the illustrated embodiment without departing from the spirit and scope of the invention.

I claim:

1. In a dry cleaning machine of the type including a cleaning chamber containing therein a liquid cleaning solvent having an upper surface, and a drum rotatable within said chamber and agitating said upper surface of said solvent therein, the improvement of means for regulating the level of said upper solvent surface, said level regulating means comprising:

a box-shaped body positioned entirely within said cleaning chamber and mounted on a wall of said machine, said box-shaped body defining therein a cavity;

said box-shaped body including inlet means for enabling passage of solvent from said chamber through said box-shaped body into said cavity, such that said solvent fills said cavity up to a level therein equal to said level of said upper solvent surface in said chamber, said inlet means comprising a first, lower plurality of openings in said box-shaped body at a level normally below said level of said solvent surface in said chamber, said first, lower plurality of openings being dimensioned to enable free flow of said solvent from said chamber to said cavity, but to prevent turbulence of said upper surface of said solvent in said chamber due to agitation by said drum from effecting the upper surface of said solvent in said cavity, such that said upper surface in said cavity is even and free of turbulence;

said box-shaped body including outlet means for enabling passage of air within said cavity above said solvent therein through said box-shaped body into said chamber, said outlet means comprising a second, upper plurality of openings in said box-shaped body at a level always above said level of said solvent surface in said chamber;

liquid level detecting means, positioned within said cavity, for detecting said level of said even and turbulent-free upper surface of said solvent in said cavity, whereby such detected level corresponds to the true level of said solvent in said chamber; and 1 means, operably connected to said level detecting means and operable in response to the detection thereby of level variations, for controlling the amount of said solvent within said chamber, and thereby for regulating the levels of said solvent in said chamber and said cavity.

2. The improvement claimed in claim 1, wherein said box-shaped body comprises a cylindrical member including a cylindrical wall, one end of which is closed by a planar wall.

3. The improvement claimed in claim 2, wherein said first, lower plurality of openings and said second, upper plurality of openings are formed in said planar wall.

4. The improvement claimed in claim 2, wherein said cylindrical member is cup-shaped, with the end of said cylindrical wall opposite to said one end being open and free of an integral wall structure.

5. The improvement claimed in claim 4, wherein said opposite, free end of said cylindrical wall is spaced slightly from said wall of said machine to define therebetween an intervening space.

6. The improvement claimed in claim 1, wherein said box-shaped body has extending therefrom tabs for attachment to said wall of said machine.

7. The improvement claimed in claim 1, wherein said level detecting means comprises a float.

8. The improvement claimed in claim 7, wherein said controlling means includes an arm having a first end connected to said float and a second end torsionally locked on a shaft extending through said wall of said machine, a cam adjustably mounted on said shaft and adapted to contact a cam follower of a switch, and head means connected to said cam for adjusting the position thereof circumferentially of said shaft.

* * * * *